Mar. 3, 1925.
E. B. FRITZ
PAPER PULP BEATING AND REFINING
Filed July 12, 1922
1,528,201
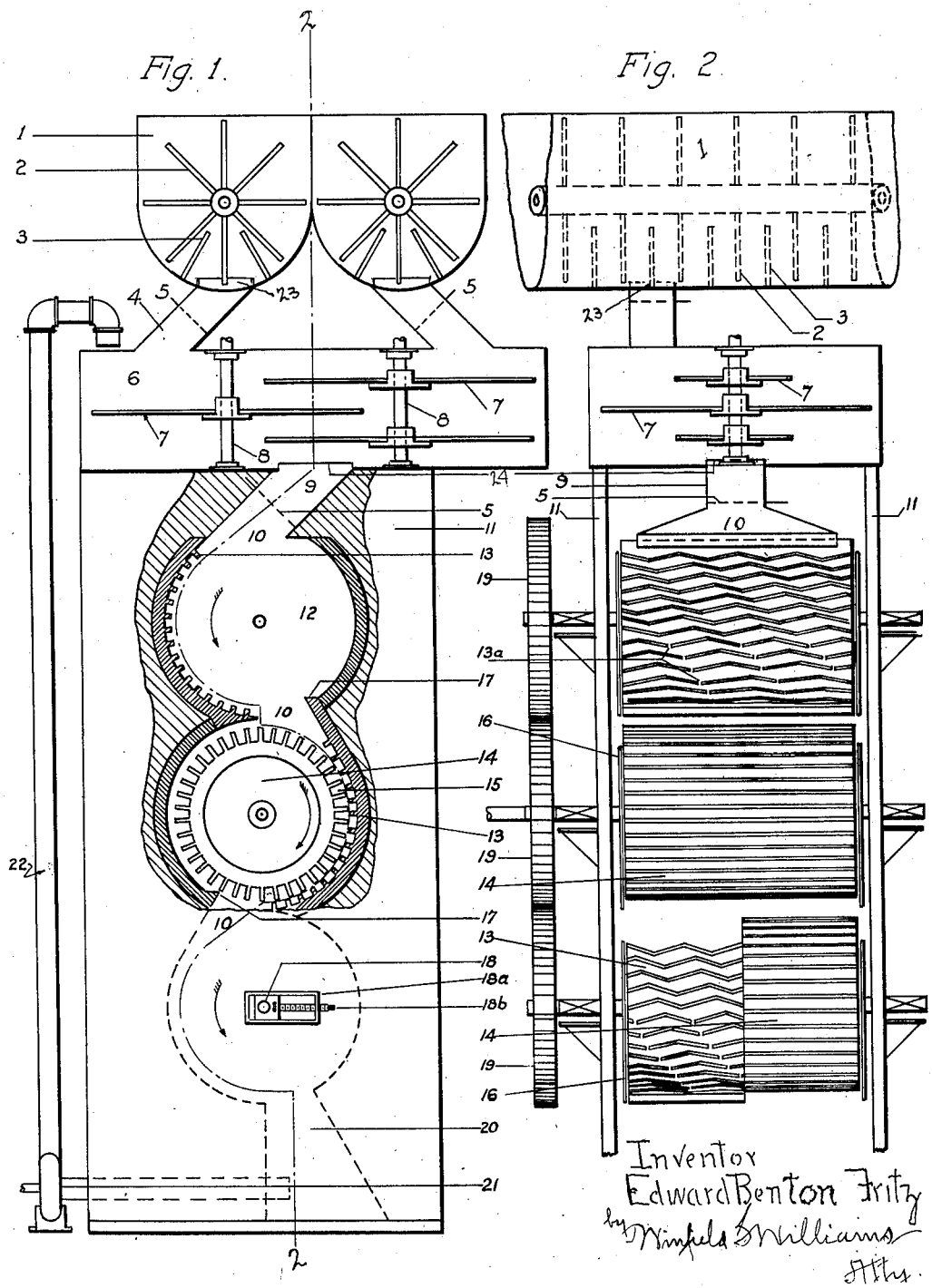

Patented Mar. 3, 1925.

1,528,201

UNITED STATES PATENT OFFICE.

EDWARD BENTON FRITZ, OF CHICAGO, ILLINOIS.

PAPER-PULP BEATING AND REFINING.

Application filed July 12, 1922. Serial No. 574,402.

*To all whom it may concern:*

Be it known that I, EDWARD BENTON FRITZ, a citizen of the United States, residing at Chicago, county of Cook, and State of Illinois, have invented a new and useful Improvement in Paper-Pulp Beating and Refining, of which the following is a specification.

This invention relates to a class of machines which are adapted for reducing paper, rags, pulp and other material used in paper making to a consistency and relation fitted to prosecute the manufacture of paper or paper stock. My objects are numerous, as will be shown by the description and claims; but my primary objects are economy of space, economy of operation, economy of construction, economy of power, economy of time, maximum beating surface and gravity process.

The accompanying drawing illustrates my principles:—

Fig. 1 is an elevation.

Fig. 2 is a section of parts along the line 2—2 of Fig. 1.

As shown in the illustration the mechanism consists of three main parts, viz: hydrating, separating and mixing tanks 1, a reservoir 6, and a housing 11 containing the beaters 14 and their associated parts. Under the method common to the paper making industry the process known as beating to reduce the material to a consistency for paper making is a large vat or receptacle in which the material is moved around in a course practically horizontal, and which material in the course of its travel is made to pass through a constricted aperture at the point of which aperture a revolving rotor is horizontally functioned causing the mass to slowly pass through the said aperture and in passing to come into contact with beating or brushing surfaces. In these processes the mass moved and operated upon being more than 90% water it is heavy, a dead weight to lift and move: and the process is necessarily relatively slow; involving a large expenditure of power. It is also well known to the art that the mechanisms employed require a large base area to accommodate them. In the device shown the ground area is very small: the material in its process of beating moves by gravity; and if it is desired to repeat the beating process on any specific mass of material it is returned to the reservoir by an ordinary type of pump.

1 is a tank receptacle into which is delivered water and the materials intended to form a pulp mixture; longitudinally rotatable in said tank 1 is a power driven flapper 2, adapted to manipulate the denser material and bring it into contact with strippers 3 fixed to the inner surface of the tank 1, and occupying the intervals between flappers 2. I provide a conduit 4 leading from the bottom of tank 1 and opening into a reservoir 6, this conduit 4 having in its course a valve or gate 5 to regulate flow therethrough. Assembled in said reservoir 6 one or more of power driven agitators 7 on shafts 8, adapted to keep the mass in solution. Leading from the reservoir 6 I provide a conduit 9 having an elongated opening mouth or opening 10. I provide a housing 11 having therein a plurality of chambers 12 superimposed one upon the other and having similar elongated openings 10 in each communicating chamber with the adjacent one. These chambers 12 extend horizontally and are circular: in each of said chambers a power driven rotor 14 is functionally journalled. In Fig. 1 of the drawing I show the upper chamber with the rotor 14 removed. The rotors 14 are preferably driven from one power connection and so geared that the rotors adjacent to each other travel in opposite directions; and I preferably arrange the speed of said rotors 14 so that each one below an upper one shall travel at a speed greater than the rotor immediately above it. I preferably show three chambers each with a rotor therein, but I may use one or more without departing from my principle. On a portion of the inner concave wall of each of the chambers 12 I provide a removable plate having on its exposed surface corrugations 13 running lengthwise and preferably in wave formation; the waves in the lower half of each section broken in their continuity, at the valleys 13ª, to prevent any of the pulp mass permanently lodging in the said valleys. On the sides of the removable plates, I provide flanges 16 as retaining walls. On the periphery of the rotors 14 I provide spaced longitudinal parallel ridges or bars 15. In Fig. 2 I show the bar surface 13 of the concave inserted plate with broken valleys 13ª; below it a rotor bar surface 15; and below that a cut section showing a rotor surface 15 in juxtaposition to a plate surface 13. At the point where each chamber 12 discharges into the chamber below it I provide a baffle 17 to prevent the mass from traveling upward with the revolutions of the rotors 14. I provide that each rotor journal 18 shall be horizontally slidable in a bearing 18ᵃ and adjusted by an adjusting screw or mechanism 18ᵇ for the purpose of regulating the clearance between the periphery 15 of the rotor 14 and the corrugations on the plate 13. The relation of travel of the rotors 14 is indicated by the direction of the arrows. The lowest chamber discharges into a receptacle 20 from whence it may be removed; I show a power driven pump 21 having communication with the receptacle 20 and an outlet 22 to the reservoir 6 whereby the mass being beaten may be returned for further action through the beaters. In the bottom of the tank 1 and surrounding the outlet 4 I provide a raised portion 23; as also in reservoir 6 a raised portion 24 to prevent any insoluble material getting into the chambers 12 or in contact with the rotors 14.

In the operation of the machine the material to be beaten and refined is delivered into the tank 1 in which tank the flappers and strippers hydrate and disintegrate the fibrous parts of the mass, separating out strings and hard material like nails and wire. When the material has entered the reservoir 6, it is kept in consistency by the agitators 7 until it is discharged into the first chamber 12; where it is caught by the revolving rotor 14 and brushed and refined between the surfaces 13 and 15, and discharged into the next lower chamber where it is brushed and refined between similar surfaces. The speed of the rotors—as described—accomplishes the taking of the mass from the rotor above faster than its normal delivery. This construction fully utilizes the economical application of gravity in the handling of the material, the great value of increased speed; the superior virtue of continuous operation; and the progressive refinement in the beating process.

It will be evident the principles here shown are subject to various embodiment, and I am limited only by the scope of my claims.

I claim,

1. In a machine of the character described, a plurality of substantially vertically aligned chambers, substantially vertically aligned rotary beaters in said chambers, said chambers having curved wall portions lying closely adjacent the surfaces of said beaters, and means for feeding material to the uppermost of said chambers, whereby said material is fed by gravity from each beater to the adjoining lower beater, said beaters co-operating to beat and refine the same into a homogeneous mass as it travels through said machine.

2. In a machine of the character described, a plurality of substantially vertically aligned chambers, substantially vertically aligned rotary beaters in said chambers, said beaters having corrugated surfaces, said chambers having curved wall portions lying closely adjacent the surfaces of said beaters, said wall portions being corrugated, and means for feeding material to the uppermost of said chambers, whereby said material is fed by gravity from each beater to the adjoining lower beater, said beaters co-operating to beat and refine the same into a homogeneous mass as it travels through said machine.

3. In a device of the character described, a plurality of beater chambers one elevated above the other, beater elements in each of said chambers and a supply chamber above said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity.

4. In a device of the character described, a plurality of beater chambers one elevated above the other, beater elements in each of said chambers and a supply chamber above said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity, the adjoining beaters rotating in opposite directions.

5. In a device of the character described, a plurality of beater chambers one elevated above the other, corrugated rotary beater elements in each of said chambers and a supply chamber above said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity.

6. In a device of the character described, a plurality of beater chambers one elevated above the other, corrugated rotary beater elements in each of said chambers and a supply chamber above said beater chambers having an inlet supply passage leading from the supply chamber to the beater in the uppermost of said beater chambers, each of said beater chambers having curved side wall portions closely conforming to the shape of said beater elements terminating in restricted openings leading to the adjoining lower chamber, whereby the material from one beater is fed directly to the next beater by gravity.

7. In a device of the character described, a plurality of beater chambers one elevated above the other, corrugated rotary beater elements in each of said chambers and a supply chamber above said beater chambers having an inlet supply passage leading from the supply chamber to the beater in the uppermost of said beater chambers, each of said beater chambers having curved corrugated side wall portions closely conforming to the shape of said beater elements terminating in restricted openings leading to the adjoining lower chamber, whereby the material from one beater is fed directly to the next beater by gravity.

8. In a beating and refining machine the combination of a primary reduction tank elevated above a reservoir tank, and communicating therewith, the said reservoir tank communicating with a plurality of vertically related intercommunicating beating and refining chambers enclosing beating and refining mechanism; a discharge outlet from the lowest of said chambers whereby material passing from the primary reduction tank through the mechanism may pursue its course by gravity.

9. In a beating and refining machine the combination of a primary reduction tank elevated above a reservoir tank, and communcating therewith, the said reservoir tank communicating with a plurality of vertically related intercommunicating beating and refining chambers enclosing beating and refining mechanism; a discharge outlet from the lowest of said chambers whereby material passing from the primary reduction tank through the mechanism may pursue its course by gravity; a pumping means associated with the discharge outlet whereby the material passing through may be returned to the reservoir tank for repeated treatment.

10. In a device of the character described, a plurality of beater chambers one elevated above the other, beater elements in each of said chambers and a supply chamber above said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity, said beaters and the side walls of said chambers having cooperating means thereon whereby the material passing through said chambers is refined to a consistency for paper making.

11. In a device for the purposes described a housing containing a vertical series of communicating chambers having curved wall portions, a portion of the wall of each of said chambers consisting of a removable curved plate bearing an irregular corrugated surface.

12. In a device for the purposes described a housing containing a vertical series of communicating circular chambers, a portion of the wall of each of said chambers consisting of a removable plate bearing an irregular corrugated surface; the corrugations of the lower portion of said removable plate broken in their continuity at their lowest points whereby material being operated upon may have free passage downward.

13. In a machine of the character described, a plurality of vertically aligned chambers, a plurality of beaters each in one of said chambers rotating on horizontal vertically aligned axes, and means for feeding material to be refined into the uppermost of said chambers.

14. In a machine of the character described, a plurality of vertically aligned chambers, a plurality of beaters each in one of said chambers rotating on horizontal vertically aligned axes, means for feeding material to be refined into the uppermost of said chambers, said chambers having curved wall portions lying closely adjacent said beaters, and means for adjusting the spacing between said wall portions and beaters.

15. In a device of the character described, a plurality of beater chambers one elevated above the other, beater elements in each of said chambers, a supply chamber above said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity, and agitating means in said supply chamber.

16. In a device of the character described, a plurality of beater chambers one elevated above the other, beater elements in each of said chambers, a receiving tank having a plurality of rotating members alternating with stationary strippers, a supply chamber between said receiving chamber and said beater chambers having an inlet supply passage leading from the supply chamber to the beater in the uppermost of said beater chambers, each of said beater chambers opening into the adjoining lower chamber adjacent the beater therein, whereby the material from one beater is fed directly to the next beater by gravity, and agitating means in said supply chamber.

17. In a device of the character described the combination of a vertical series of chambers and a vertical series of rotors functioning therein, the chambers communicating, the upper of said chambers having an inlet communicating with a reservoir above said chambers; means in the bottom of said reservoir and associated with its discharge outlet whereby insoluble material is prevented from passing into said chambers.

18. In a device of the character described the combination of a vertical series of chambers intercommunicating and enclosing a series of vertically related rotors, the upper set of chambers having an inlet communicating with a reservoir, said reservoir fed from a receiving tank located above said reservoir; means in the bottom of said receiving tank and associated with a conduit connecting said receiving tank with said reservoir for preventing the passage from said receiving tank into said reservoir of insoluble material.

19. In a device for the purposes described the combination with a series of beaters and a reservoir associated therewith of a receiving tank communicating with said reservoir; said receiving tank containing a horizontally rotatable shaft, said shaft having a plurality of flappers whereby material to be converted into pulp is manipulated and disintegrated: fixed in the walls of said tank projecting strippers intermediate of the said flappers whereby material deposited in said receiving tank is caused to be disintegrated and hydrated.

20. In a device for pulp beating and refining substantially as described, valves assembled in the conduits connecting the receiving tanks with the reservoir, also valves in the conduit connecting the reservoir with the upper chamber whereby the material being operated upon may be regulated in its passage from each of the said containers.

Signed at Chicago, Illinois, this 30th day of June, A. D. 1922.

EDWARD BENTON FRITZ.

Witness:
A. SCOTT DOWD.